US012608792B1

(12) United States Patent
Gazit et al.

(10) Patent No.: US 12,608,792 B1
(45) Date of Patent: Apr. 21, 2026

(54) VEHICLE DAMAGE VALIDATION USING SYMMETRY-BASED DEEP LEARNING

(71) Applicant: UVeye Ltd., Tel Aviv (IL)

(72) Inventors: Shirel Gazit, London (GB); Itai Orr, Or Akiva (IL); Amir Hever, Tenafly, NJ (US)

(73) Assignee: UVeye Ltd., Tel Aviv (IL)

( * ) Notice: Subject to any disclaimer, the term of this patent is extended or adjusted under 35 U.S.C. 154(b) by 0 days.

(21) Appl. No.: 19/006,629

(22) Filed: Dec. 31, 2024

(51) Int. Cl.
| | |
|---|---|
| *G06T 7/00* | (2017.01) |
| *G06Q 40/08* | (2012.01) |
| *G06V 10/25* | (2022.01) |
| *G06V 10/60* | (2022.01) |
| *G06V 10/82* | (2022.01) |

(52) U.S. Cl.
CPC ............ *G06T 7/001* (2013.01); *G06Q 40/08* (2013.01); *G06V 10/25* (2022.01); *G06V 10/60* (2022.01); *G06V 10/82* (2022.01); *G06T 2200/24* (2013.01); *G06T 2207/20081* (2013.01); *G06T 2207/20084* (2013.01); *G06T 2207/30252* (2013.01)

(58) Field of Classification Search
CPC ................. G06T 7/001; G06T 2200/24; G06T 2207/20081; G06T 2207/20084; G06T 2207/30252; G06Q 40/08; G06V 10/25; G06V 10/60; G06V 10/82
See application file for complete search history.

(56) References Cited

U.S. PATENT DOCUMENTS

| | | | | |
|---|---|---|---|---|
| 11,144,889 | B2 * | 10/2021 | Li | G06N 5/01 |
| 2018/0012350 | A1 * | 1/2018 | Gangitano | G01N 21/8806 |
| 2018/0260793 | A1 * | 9/2018 | Li | G06T 19/20 |
| 2018/0293552 | A1 * | 10/2018 | Zhang | G06Q 10/06313 |
| 2018/0322623 | A1 * | 11/2018 | Memo | G06N 3/09 |
| 2020/0008990 | A1 * | 1/2020 | Harrison | B62K 5/025 |
| 2021/0170960 | A1 * | 6/2021 | Gould | B60R 25/1004 |
| 2021/0304592 | A1 * | 9/2021 | Lepp | H04W 4/40 |
| 2022/0148050 | A1 * | 5/2022 | Gandhi | G06N 3/0464 |

* cited by examiner

*Primary Examiner* — Stephen R Koziol

(57) ABSTRACT

A computer-implemented method and system for validating vehicle damage detection utilizes symmetry-based analysis of opposing vehicle sides. The method comprises receiving images from opposing sides of a vehicle, detecting a damage region in one image, and computing deep learning feature vectors for the damage region and a corresponding region in the opposite image. These feature vectors represent learned visual patterns that discriminate between damage and normal vehicle features. A similarity measure is computed between the feature vectors, and the detected damage is validated based on this measure. The system includes sensors for image capture, processors, and memory storing instructions to execute the method. This approach leverages vehicle symmetry to reduce false positives, compensate for environmental variations, and improve damage detection accuracy. The method can adapt to asymmetric vehicle positioning and varying environmental conditions, providing robust performance in real-world scenarios.

18 Claims, 4 Drawing Sheets

| Class | Precision | Recall | F1 | support |
|---|---|---|---|---|
| Dent | 0.9 | 0.85 | 0.88 | 87 |
| Symmetry | 0.84 | 0.9 | 0.87 | 78 |

VEHICLE DAMAGE VALIDATION USING SYMMETRY-BASED DEEP LEARNING

FIELD AND BACKGROUND OF THE INVENTION

The present invention, in some embodiments thereof, relates to computer-based vehicle damage assessment systems and, more particularly, but not exclusively, to a computer-based vehicle damage assessment systems for detecting dents.

Computer-based vehicle damage assessment systems are becoming increasingly important in various industries, including insurance, vehicle inspection, and fleet management. These systems typically involve capturing images or videos of vehicles and using automated analysis to identify and assess damage. However, several technical challenges exist in achieving accurate and reliable damage detection.

SUMMARY OF THE INVENTION

According to an aspect of some embodiments of the present invention there is provided a computer-implemented method for analyzing vehicle damage, comprising:

receiving, at one or more processors, first and second images from opposing sides of a vehicle;

detecting, using the one or more processors, a damage region in the first image;

computing, by a neural network, deep learning feature vectors comprising learned visual representations of the damage region in the first image and a corresponding region in the second image, wherein the deep learning feature vectors comprise numerical representations of visual patterns learned through neural network training to discriminate between damage patterns and normal vehicle features;

computing a similarity measure between the deep learning feature vectors of the damage region and the corresponding region; and validating the detected damage region based on the similarity measure.

Optionally, the method validates the detected damage region by computing an error measure between corresponding deep learning feature vectors from opposing sides of the vehicle to detect asymmetric visual patterns, filtering false positive detections caused by symmetric design features of the vehicle based on the error measure, and classifying the damage region as validated damage when the error measure exceeds a learned asymmetry threshold.

Optionally, the method detects the damage region by generating a first bounding box around the damage region in the first image and determining a projected bounding box location in the second image by applying a geometric transformation to the first bounding box, wherein the geometric transformation accounts for asymmetric positioning of the vehicle between the first and second images.

Optionally, the method computes the deep learning feature vectors by extracting a first localized deep learning feature vector from the neural network's feature maps of the first image using the first bounding box and extracting a second localized deep learning feature vector from the neural network's feature maps of the second image using the projected bounding box.

Optionally, the method further comprises generating a damage assessment report based on validated damage regions for processing an insurance claim.

Optionally, the method further comprises performing max pooling operations on the extracted deep learning feature vectors to generate fixed-dimension feature representations prior to computing the similarity measure.

Optionally, the method further comprises filtering detected damage regions having a similarity measure below a predetermined threshold.

Optionally, the neural network comprises a single end-to-end detection network trained to simultaneously detect vehicle damage and generate deep learning feature vectors.

Optionally, computing deep learning feature vectors comprises performing region of interest pooling operations on convolutional feature maps generated by the neural network.

Optionally, the method further comprises determining lighting conditions in the first and second images and validating the lighting conditions meet a quality threshold prior to computing the deep learning feature vectors.

Optionally, the neural network is trained using a dataset comprising images of vehicles having known symmetric and asymmetric regions.

Optionally, the method further comprises normalizing brightness and contrast of corresponding regions in the first and second images prior to computing the deep learning feature vectors.

Optionally, validating comprises computing a confidence score based on the similarity measure and classifying the damage region as validated when the confidence score exceeds a threshold.

Optionally, the method further comprises detecting multiple damage regions in the first image, computing an aggregate similarity score based on similarity measures of all detected damage regions, and validating the damage regions collectively when the aggregate similarity score exceeds a threshold.

Optionally, when the similarity measure fails to validate the damage region, the method further comprises capturing additional images of the vehicle from different angles, performing the computing steps using the additional images, and validating the damage region based on a combined analysis of all captured images.

Optionally, the method further comprises detecting environmental conditions during image capture, applying environmental-specific preprocessing to the images based on the detected conditions, and adjusting similarity measure thresholds based on the environmental conditions.

According to another aspect of some embodiments of the present invention, there is provided a system for validating vehicle damage detection, comprising:

Sensors configured to capture images of opposing sides of a vehicle;

One or more processors; and

A memory storing instructions that, when executed by the one or more processors, cause the system to:

1. Receive first and second images from the sensors;

2. Process the first and second images to:

a. Detect damage regions in the first image, and compute, using a neural network, feature representations of corresponding regions in the first and second images;

b. Determine similarity measures between the feature representations; and c. Validate detected damage regions based on the similarity measures.

Optionally, the sensors comprise multiple cameras arranged in a fixed geometry relative to a vehicle scanning path.

Optionally, the system further comprises a display device configured to present a user interface showing:

The detected damage regions;

Corresponding symmetry comparison regions; and

Validation results for each detected damage region.

Optionally, the sensors are configured to capture the first and second images while the vehicle moves through a scanning station.

Optionally, the system further comprises:

Processors including one or more central processing units (CPUs), graphics processing units (GPUs), or neural processing units (NPUs);

A communication interface enabling data exchange between system components and external devices;

A memory storing computer-executable instructions, trained machine learning models, vehicle databases, and other data used in damage validation.

The embodiments of the present invention provide significant technical advantages, including increased accuracy in damage detection through symmetrical validation, reduction in false positives from vehicle design features, and robust performance across varying environmental conditions. The method can effectively handle different vehicle types and damage patterns while maintaining computational efficiency.

These and other aspects, features, and advantages of the present invention will become apparent from the following detailed description of the invention, which is to be read in connection with the accompanying drawings.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

DESCRIPTION OF SPECIFIC EMBODIMENTS OF THE INVENTION

Figure 1:
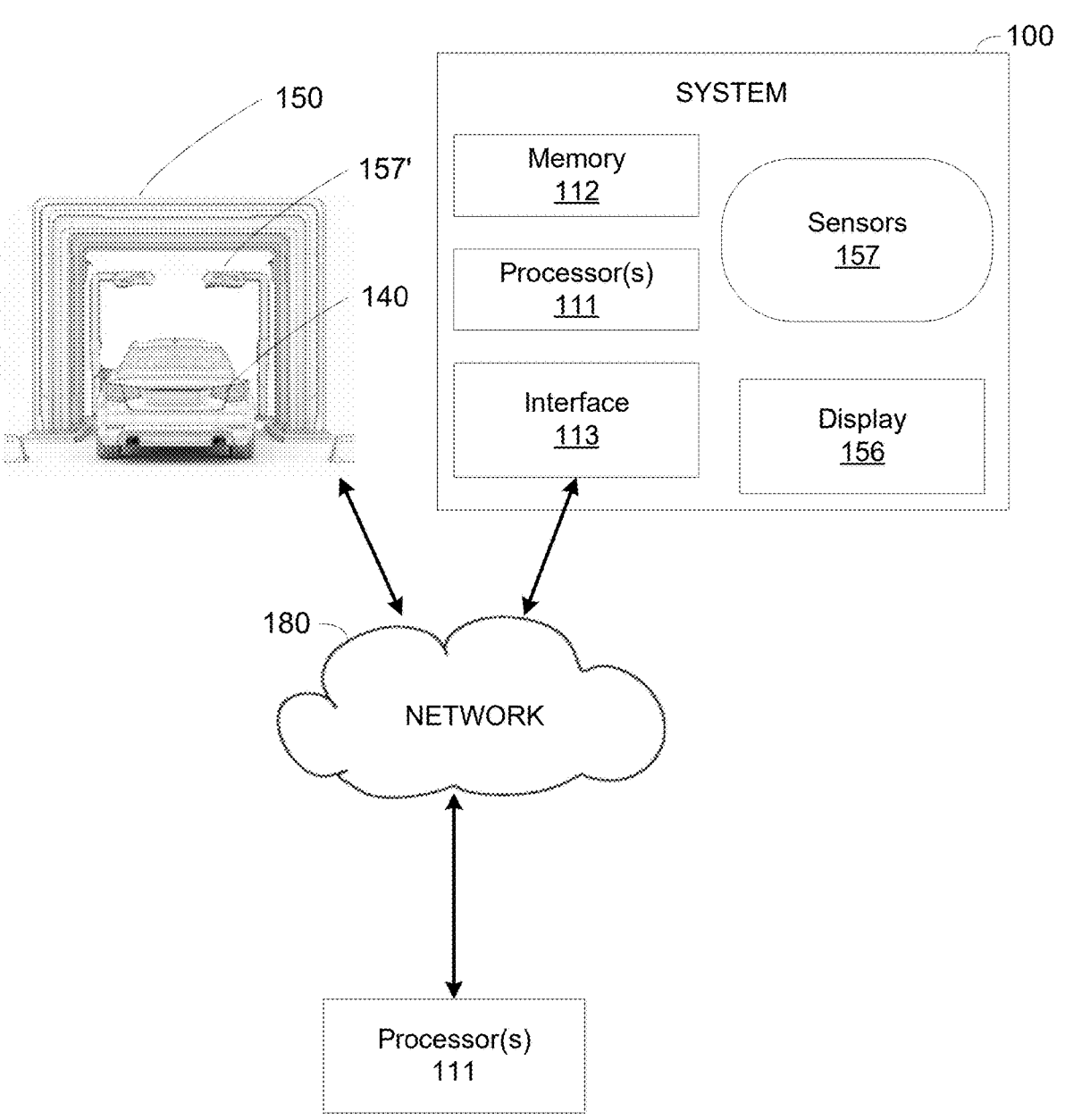
FIG. 1 is a schematic illustration of a system for validating vehicle damage detection, in accordance with some embodiments of the present invention.

The present invention, in some embodiments thereof, relates to computer-based vehicle damage assessment systems and, more particularly, but not exclusively, to a computer-based vehicle damage assessment systems for detecting dents.

One significant technical challenge of computer-based vehicle damage assessment systems involves distinguishing between actual vehicle damage and various visual artifacts that can appear in digital images. These artifacts may result from lighting conditions, reflections, or normal vehicle features that can be misinterpreted as damage. Additionally, the complex geometries and varied surface materials of modern vehicles can create complications in automated damage detection.

Another technical challenge arises from the computational requirements of processing high-resolution vehicle images. The need to analyze multiple high-definition images while maintaining real-time or near-real-time performance presents significant technical hurdles. This challenge is particularly acute when attempting to implement sophisticated damage detection algorithms on mobile devices or in resource-constrained environments.

Furthermore, environmental factors such as varying lighting conditions, shadows, and reflective surfaces can significantly impact the reliability of automated damage detection systems. These environmental variations can lead to inconsistent results and reduce the accuracy of damage assessments.

The increasing diversity of vehicle designs and materials also presents technical challenges. Modern vehicles often incorporate complex surface patterns, decorative elements, and various material finishes that can complicate the task of distinguishing between intentional design features and actual damage.

Embodiments of the present invention handles the need for improved systems and methods that can overcome these technical challenges to provide more accurate and reliable vehicle damage detection and assessment.

Embodiments of the present invention presents an advanced computer-implemented method and system for validating vehicle damage detection using symmetry-based deep learning analysis. At its core, the system employs a sophisticated neural network that simultaneously detects potential damage regions and generates deep learning feature vectors representing these regions. This integrated approach significantly enhances computational efficiency and accuracy.

The system leverages the inherent symmetry of vehicles by comparing corresponding regions on opposite sides. It applies geometric transformations to account for asymmetric vehicle positioning, ensuring accurate comparisons even in imperfect real-world conditions. The use of region of interest pooling and max pooling operations on convolutional feature maps allows for efficient, scale-invariant analysis of damage areas.

A key innovation is the computation of similarity measures between deep learning feature vectors using cosine similarity in high-dimensional space. This approach provides a nuanced comparison that is robust to minor variations in lighting and perspective, effectively distinguishing between actual damage and normal vehicle features or visual artifacts.

Embodiments of the present invention addresses several critical challenges in automated vehicle damage assessment:

1. False Positive Reduction: By leveraging vehicle symmetry and advanced feature comparison, the system significantly reduces false positives caused by lighting conditions, reflections, or model-specific design features.

2. Environmental Adaptability: The system's ability to detect and adapt to various environmental conditions, including varying lighting and weather, ensures consistent performance across diverse inspection scenarios.

3. Computational Efficiency: The end-to-end neural network architecture that simultaneously detects damage and generates feature vectors optimizes processing resources, enabling real-time or near-real-time damage assessment even on mobile or resource-constrained devices.

4. Accuracy in Complex Scenarios: The system effectively handles challenges posed by modern vehicle designs, including complex surface patterns and varied materials, providing accurate damage detection across different vehicle types and models.

5. Objectivity and Consistency: By employing deep learning and standardized comparison metrics, the system ensures objective and consistent damage assessments, reducing variability in human-led inspections.

Embodiments of the present invention collectively advance the state of the art in automated vehicle damage assessment, offering a more accurate, efficient, and adaptable system for use in insurance, vehicle inspection, and fleet management applications.

The present invention in some embodiments thereof addresses significant technical challenges in the field of automated vehicle damage assessment. Existing systems often struggle with accurately distinguishing between actual vehicle damage and visual artifacts or design features, leading to high rates of false positives and negatives. This invention provides a novel technical solution by leveraging deep learning and symmetry-based analysis to significantly improve the accuracy and reliability of damage detection. The system's ability to adapt to varying environmental conditions and vehicle positioning represents a substantial advancement in the technical field, overcoming limitations of prior art systems.

The invention in some embodiments thereof presents a tangible improvement to computer technology in the realm of image analysis and machine learning. By implementing a single end-to-end neural network that simultaneously detects damage and generates feature vectors, the system achieves computational efficiencies not realized in conventional multi-step processes. This integrated approach reduces processing time and resource requirements, enabling real-time or near-real-time damage assessment even on mobile or resource-constrained devices. The novel application of deep learning techniques to this specific problem domain results in a system that is more than a mere automation of human processes, but rather a technological advancement that surpasses human capabilities in speed, consistency, and accuracy The invention in some embodiments thereof presents is integrated into a practical application that goes beyond abstract idea implementation. The invention is specifically designed to work within the constraints and challenges of real-world vehicle inspection scenarios, including varying lighting conditions, diverse vehicle designs, and imperfect positioning. The system's ability to generate actionable damage assessment reports directly applicable to insurance claim processing demonstrates its integration into a specific, useful application in the automotive and insurance industries.

The invention in some embodiments thereof effectuates a transformation of visual data into a novel form of deep learning feature vectors specifically tuned to vehicle damage characteristics. This transformation is not merely a mathematical operation but a complex process that encodes learned patterns of damage and normal vehicle features into high-dimensional representations. The subsequent analysis and comparison of these feature vectors represent a non-conventional and non-generic use of computer technology to solve the technical problem of accurate vehicle damage detection.

The invention in some embodiments thereof employ technical implementations such as region of interest pooling, geometric transformations to account for asymmetric vehicle positioning, and adaptive thresholding based on environmental conditions. These are not generic computer functions but specialized processes developed to address the unique challenges of vehicle damage assessment. The use of cosine similarity in high-dimensional feature space for damage validation represents a technical approach that goes beyond simple data comparison, leveraging advanced mathematical concepts to improve accuracy.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Referring now to the drawings, FIG. 1 illustrates a system (100) for validating vehicle damage detection includes sensors (157) configured to capture images of opposing sides of a vehicle (140), one or more processors (111), and a memory (112) storing instructions that, when executed by the one or more processors, cause the system to receive first and second images from the sensors, process the first and second images to detect damage regions and compute feature representations of corresponding regions, determine similarity measures between the feature representations, and validate detected damage regions based on the similarity measures.

The sensors (157) may include various types of image capture devices such as high-resolution cameras, infrared cameras, depth cameras, or 3D scanners. In some embodiments, the sensors (157) are arranged in a fixed geometry relative to a vehicle scanning path. Alternatively, the sensors may be mounted on mobile platforms or handheld devices. The sensors may also include supplementary devices such as light sources, rangefinders, or motion sensors to improve image capture quality.

Optionally, the sensors are configured in a fixed scanning station through which vehicles move for inspection. The scanning station may include multiple cameras arranged at predetermined positions and angles to capture comprehensive vehicle images. The fixed geometry may include cameras positioned at specified heights and distances to ensure consistent image capture across different vehicle sizes and models. The scanning station may further include guide markers or automated positioning systems to help align vehicles for optimal image capture.

Optionally, the system further comprises a display device (156) configured to present a user interface (600) showing the detected damage regions, corresponding symmetry comparison regions, and validation results for each detected damage region. The user interface may include interactive elements allowing users to zoom into specific damage areas, adjust image views, and review validation metrics. The display device may show split-screen views of opposing vehicle sides, overlay damage annotations on vehicle images, and provide visual indicators of validation confidence levels.

The processors (111) may include one or more central processing units (CPUs), graphics processing units (GPUs), or specialized neural processing units (NPUs). The processors may be distributed across multiple computing devices connected via a network (108).

The memory (112) may include various types of computer-readable storage media, such as RAM, ROM, flash memory, or magnetic storage. The memory stores computer-executable instructions and may also store trained machine learning models, vehicle databases, and other data used in damage validation.

The system may include a communication interface (113) that enables data exchange between system components and external devices. The communication interface may support various protocols including WiFi, cellular networks, Ethernet, or specialized vehicle communication protocols.

In use, the processor(s) execute a symmetry-based filtering algorithm to validate detected damage regions. For example, the execution is performed such that for an image (e.g. each or any other image or randomly selected images) in a set of scanned vehicle images: an opposite side image of the vehicle is obtained. Then a detection neural network is applied to the current image to obtain damage detections and feature maps. The detection neural network is also applied to the opposite side image to obtain opposite side feature maps. For each detected damage region in the current image: the detected region may be projected to a corresponding location on the opposite side image to allow extracting and pooling features from the current image's feature maps within the detected region. Features from the opposite side image's feature maps within the projected region are also extracted and pooled. This allows computing a similarity score between the extracted features from the current and opposite side images, wherein the similarity score is calculated using, for example, a cosine similarity metric in the high-dimensional feature space. This allows comparing the computed similarity score to a predetermined threshold and discarding the detected damage region if the similarity score is below the threshold.

As used herein, the term "deep learning feature vectors" refers to numerical representations of visual patterns learned through neural network training, specifically designed to discriminate between damage patterns and normal vehicle features. For example: 1. When analyzing a vehicle door panel, a deep learning feature vector might represent: —The smoothness of the surface (e.g., [0.95, 0.88, 0.92]) —The presence of edges or contours (e.g., [0.12, 0.08, 0.15]) —Color consistency across the panel (e.g., [0.99, 0.97, 0.98]) 2. For a detected dent, the feature vector could capture: —The depth of the depression (e.g., [0.45, 0.38, 0.41]) —The circularity of the dent shape (e.g., [0.78, 0.82, 0.80]) —Texture changes around the dent edges (e.g., [0.65, 0.59, 0.62]) 3. When examining a bumper for damage, the feature vector might include: —Alignment with adjacent body panels (e.g., [0.92, 0.89, 0.90]) —Presence of scratches or scuff marks (e.g., [0.18, 0.22, 0.20]) —Deformation of standard bumper contours (e.g., [0.35, 0.30, 0.33]) 4. For paint damage detection, a feature vector could represent: —Color consistency with undamaged areas (e.g., [0.88, 0.91, 0.89]) —Presence of chipping or peeling (e.g., [0.25, 0.28, 0.26]) —Texture changes indicative of repainting (e.g., [0.15, 0.12, 0.14]) These numerical representations allow the system to quantify and compare complex visual patterns, enabling precise discrimination between damaged and undamaged vehicle features across various scenarios.

As used herein, "symmetry-based analysis" refers to a method of comparing corresponding regions on opposite sides of a vehicle to validate detected damage by leveraging the inherent symmetrical nature of vehicle structures. For example:

1. Door Panel Comparison: When a dent is detected on the driver's side door, the system analyzes the corresponding region on the passenger side door. If the passenger side shows no abnormalities, this asymmetry supports validating the dent as genuine damage.
2. Fender Analysis: If scratches are detected on the left front fender, the system examines the right front fender for similar patterns. The absence of matching scratches on the opposite side helps confirm the damage on the left fender.
3. Bumper Inspection: When assessing a misaligned rear bumper, the system compares the gap measurements and contour alignments on both sides of the vehicle. Significant differences in these measurements between the left and right sides can indicate validated damage.
4. Headlight Evaluation: If a cracked headlight is detected on one side, the system compares it with the intact headlight on the opposite side. The stark difference in appearance and structural integrity between the two helps validate the damage.
5. Side Mirror Assessment: For a damaged side mirror, the system compares its shape, position, and surface characteristics with the mirror on the opposite side. Deviations from the expected symmetry can confirm the damage.
6. Wheel Arch Examination: When analyzing a dented wheel arch, the system compares its curvature and alignment with the corresponding arch on the other side. Asymmetries in these measurements can validate the presence of damage.

This symmetry-based approach allows the system to effectively distinguish between actual damage and normal vehicle features or environmental artifacts, significantly reducing false positive detections.

As used herein, "neural network" refers to a computer system model capable of learning and making decisions, particularly in the context of image analysis and damage detection. For example the term may be used to cover one or more neural networks such as:

1. Damage Detection Network: A convolutional neural network trained on thousands of vehicle images to identify and localize various types of damage such as dents, scratches, and paint chips. This network can analyze a new image of a vehicle panel and highlight potential damage areas.

2. Feature Extraction Network: A deep neural network designed to generate high-dimensional feature vectors that represent complex visual patterns in vehicle surfaces. For instance, when analyzing a car door, this network might produce a 256-dimensional vector capturing subtle texture and contour information.

3. Symmetry Analysis Network: A specialized neural network architecture that simultaneously processes images of opposing vehicle sides, learning to identify asymmetries that may indicate damage. This network could, for example, compare feature representations of left and right fenders to detect unilateral damage.

4. Multi-task Learning Network: An end-to-end neural network that performs both damage detection and feature vector generation in a single forward pass. For example, when processing an image of a bumper, this network could simultaneously identify a crack and generate a feature representation of the damaged area.

5. Environment Adaptation Network: A neural network trained to adjust its damage detection parameters based on environmental conditions. For instance, it might modify its sensitivity thresholds when analyzing images captured in low light or rainy conditions.

6. 3D Reconstruction Network: A neural network that processes multiple 2D images to generate a 3D model of the vehicle, allowing for more accurate damage assessment. This network could, for example, reconstruct the precise contours of a dented hood from various angle shots.

7. Confidence Scoring Network: A neural network that assesses the reliability of damage detections by analyzing the feature vectors and outputting a confidence score. For instance, it might assign a higher confidence to a clearly visible dent compared to a subtle paint scratch.

As used herein, "bounding box" refers to a rectangular border that is drawn around a detected region of interest in an image, such as an area of potential vehicle damage.

As used herein, "cosine similarity" refers to a measure of similarity between two vectors in an inner product space that measures the cosine of the angle between them, used in this context to compare deep learning feature vectors. For example:

1. Comparing Door Panels: When analyzing a potential dent on a driver's side door, the system might generate feature vectors for both the damaged and the corresponding area on the passenger side. If the cosine similarity between these vectors is 0.98 (where 1.0 indicates perfect similarity), it suggests the areas are highly similar, potentially indicating a false positive detection.

2. Assessing Bumper Damage: If a scratch is detected on the left side of the front bumper, the system computes feature vectors for this region and its mirror counterpart on the right side. A cosine similarity of 0.45 between these vectors indicates significant dissimilarity, supporting the validation of the detected damage.

3. Fender Comparison: When examining a suspected dent on the left front fender, the system might find a cosine similarity of 0.75 with the corresponding right fender area. This intermediate value could trigger additional analysis or image capture to confirm the damage.

4. Paint Damage Evaluation: For a detected paint chip on the hood, the system could compare it with multiple surrounding undamaged areas. If the average cosine similarity with these areas is 0.30, it strongly suggests the detected region is indeed damaged.

5. Taillight Analysis: When assessing a cracked taillight, the feature vector comparison with the opposite intact taillight might yield a cosine similarity of 0.20, clearly indicating an asymmetry that validates the damage detection.

6. Roof Dent Detection: For a subtle dent on the roof, the system might compare it with multiple undamaged roof sections. A cosine similarity consistently below 0.90 across these comparisons could confirm the presence of damage, even if it's not immediately obvious visually.

In each case, the cosine similarity provides a nuanced, scale-invariant measure of how similar or different the feature representations are, allowing for robust damage validation across various vehicle parts and damage types.

As used herein, "region of interest pooling" refers to a technique that extracts a fixed-size feature map from a region of interest in a convolutional feature map, regardless of the size or aspect ratio of the input region. For example:

1. Dent Analysis: When examining a large dent on a car door, region of interest pooling might extract a 7×7 feature map from the convolutional layers, whether the dent covers a small area (e.g., 50×50 pixels) or a larger area (e.g., 200×200 pixels).

2. Scratch Detection: For a long, narrow scratch on a fender, the technique could produce a consistent 5×5 feature representation, despite the scratch's elongated shape in the original image.

3. Bumper Damage: When analyzing a cracked bumper corner, region of interest pooling might generate a 3×3 feature map, maintaining the same output size regardless of whether the damage spans a small corner or extends across a larger portion of the bumper.

4. Paint Chip Evaluation: For small paint chips of varying sizes, the technique could extract 4×4 feature maps, ensuring consistent representation whether the chip is barely visible or more pronounced.

As used herein, "geometric transformation" refers to the mathematical process of projecting a region from one image to a corresponding location in another image, accounting for differences in vehicle positioning or perspective. For example:

1. Door Panel Comparison: If a dent is detected on the driver's side door, the geometric transformation calculates where that same region should appear on the passenger side image, even if the vehicle is slightly angled in the capture area.

2. Fender Analysis: When examining a scratch on the left front fender, the transformation projects this region onto the right front fender image, adjusting for any differences in distance or angle between the two sides of the vehicle and the cameras.

3. Headlight Inspection: If damage is detected on one headlight, the geometric transformation determines the exact corresponding area on the opposite headlight, accounting for any perspective distortion in the images.

4. Roof Assessment: For a dent on one side of the roof, the transformation calculates its mirrored position on the other side, adjusting for the curved surface of the roof and any tilt in the vehicle's positioning.

5. Wheel Arch Examination: When analyzing damage near a wheel arch, the geometric transformation maps this area to the corresponding arch on the other side, accounting for differences in wheel position or vehicle alignment during image capture.

These techniques enable precise, consistent analysis of vehicle damage across different regions and image captures, enhancing the accuracy of the symmetry-based validation process.

As used herein, "false positive" refers to an incorrect detection of damage where none actually exists, often caused by visual artifacts, lighting conditions, or normal vehicle features.

As used herein, "F1 score" refers to a measure of a model's accuracy that considers both precision and recall, calculated as the harmonic mean of these two metrics.

As used herein, "environmental conditions" refer to external factors such as lighting, weather, and surrounding objects that can affect the quality and characteristics of captured vehicle images.

Optionally, the neural network comprises a single end-to-end detection network trained to simultaneously detect vehicle damage and generate deep learning feature vectors. For example, when processing an image of a vehicle door, the network simultaneously identifies potential damage regions and generates the corresponding feature vectors in a single forward pass, rather than using separate networks for detection and feature extraction. In one implementation, the network architecture may include shared convolutional layers that feed into parallel branches for damage detection and feature vector generation. In another implementation, the network may use attention mechanisms to focus on relevant image regions while generating both outputs. This integrated approach provides significant computational efficiency benefits by eliminating the need for multiple network evaluations, reducing memory requirements, and decreasing overall processing latency. The shared feature learning between detection and feature generation tasks also leads to more coherent and reliable damage validation results, as both outputs are based on the same underlying learned representations.

A pseudo code of such an algorithm is described herein:

```
For image in scan_images:
    op_image = image.get_op_image( )
    detections, features = detection_network(image)
    _, op_features = detection_network(image)
    For det, f, op_fin detections, features, op_features:
        det_opposite = project(det) #horizontal flip
        feature_det_crop = crop_and_pool feature(f, det)
        op_feature_det_crop = crop_and_pool_feature(op_f, op_det)
        similarity_score = distance(feature_det_crop,
        op_feature_det_crop) # cosine similarity
        If similarity_score < threshold:
            Drop det
```

An execution of such a symmetry-based filtering algorithm reduces false positive detections by leveraging the inherent symmetry of vehicle structures. The use of a neural network for both detection and feature extraction provides a consistent, learned representation of vehicle surfaces. The projection of detected regions to the opposite side accounts for potential asymmetries in vehicle positioning during image capture. The feature cropping and pooling operations allow for localized, scale-invariant comparison of potential damage areas. The cosine similarity metric in high-dimensional space provides a nuanced comparison that is robust to minor variations in lighting or perspective. By discarding detections with high similarity to their opposite side counterparts, the system effectively filters out false positives caused by symmetric vehicle features or imaging artifacts, thereby significantly improving the overall accuracy of the damage detection process.

Optionally, the neural network is trained using a dataset comprising images of vehicles having known symmetric and asymmetric regions. For example, the training dataset may include pairs of images showing the same vehicle regions before and after damage, along with images of undamaged symmetrical features like door panels, fenders, and bumpers. In one implementation, the training data might include diverse vehicle models with varying design features, captured under different lighting and environmental conditions. In another implementation, the dataset may incorporate synthetic data augmentation to expand the range of damage patterns and vehicle configurations. This specialized training approach enables the neural network to effectively distinguish between intentional asymmetric design elements and actual damage. The method provides particular benefits in reducing false positives from vehicle-specific design features while maintaining high sensitivity to genuine damage patterns. The trained network demonstrates robust performance across different vehicle makes and models, even when encountering previously unseen vehicle designs.

The system provides several technical benefits including improved accuracy in damage detection by validating against symmetrical vehicle regions, reduced false positives from normal vehicle features, compensation for varying lighting and environmental conditions, real-time or near-real-time damage validation, scalable processing across distributed computing resources and/or integration with existing vehicle inspection workflows.

The system may be implemented in various configurations, such as a fixed inspection station (150), a mobile inspection unit, or a distributed system with cloud-based processing. The system's modular architecture allows for flexible deployment and upgrading of individual components while maintaining overall system functionality.

The system provides several key advantages over existing vehicle damage assessment systems. While some systems utilize image analysis for damage detection, the current system introduces a novel approach that significantly enhances accuracy and reliability. A key distinguishing feature of the system is its use of deep learning feature vectors to represent damage regions and corresponding undamaged regions. Unlike traditional image processing techniques, these feature vectors capture complex, learned visual patterns that are specifically tuned to discriminate between damage and normal vehicle features. This approach provides superior performance in distinguishing actual damage from design elements or visual artifacts. Furthermore, the system, and method described below, of computing similarity measures between these deep learning feature vectors from opposing sides of the vehicle represents a significant advancement. This symmetry-based validation technique allows for more robust damage verification, effectively filtering out false positives that might be caused by lighting conditions, reflections, or model-specific design features. The use of techniques such as cosine similarity in high-dimensional feature space allows for nuanced comparison that goes beyond simple visual matching. The adaptive nature of the system, including its ability to adjust to environmental conditions and vehicle positioning, addresses practical challenges not fully resolved by prior art systems. For instance, the geometric transformation to account for asymmetric vehicle positioning enables reliable damage validation even in imperfect real-world scanning scenarios. Additionally, the end-to-end neural network architecture that simultaneously detects damage and generates feature vectors represents a novel, more efficient approach compared to systems that use separate processes for detection and feature extraction. This integrated approach not only improves computational efficiency but also leads to more coherent and reliable damage assessments. In summary, while some systems provide foundational concepts in automated vehicle damage assessment, the system and method described herein introduce novel techniques in deep learning, feature representation, and symmetry-based validation that significantly advance the state of the art in terms of accuracy, reliability, and practical applicability in real-world scenarios.

Optionally, the sensors are configured in a fixed scanning station through which vehicles move for inspection. The scanning station may include multiple cameras arranged at predetermined positions (e.g., 157') and angles to capture comprehensive vehicle images as the vehicle passes through. For example, the station could have two parallel rows of cameras on either side, with cameras positioned at different heights to capture the full vehicle profile. As the vehicle moves through the station at a controlled speed, the cameras are triggered to capture synchronized images of both sides simultaneously. The fixed geometry of the scanning station ensures consistent image capture across different vehicle sizes and models. The station may incorporate guide rails or automated conveyor systems to control the vehicle's path and speed, ensuring optimal positioning for image capture. Additionally, the station may include specialized lighting systems that move in sync with the vehicle to provide uniform illumination and reduce shadows or glare. This scanning station configuration enables high-throughput vehicle inspections, as vehicles can be continuously processed without stopping. The fixed camera positions may allow for precise calibration and image alignment, improving the accuracy of symmetry-based damage detection and controlled lighting and vehicle positioning reduce variables that could affect image quality or damage visibility. The system can easily integrate additional sensors, such as LIDAR or infrared cameras, for more comprehensive vehicle analysis. The synchronized capture of opposing side images while the vehicle is in motion provides a consistent dataset for the damage validation algorithm, enhancing its ability to detect asymmetries and validate damage accurately.

Figure 2:
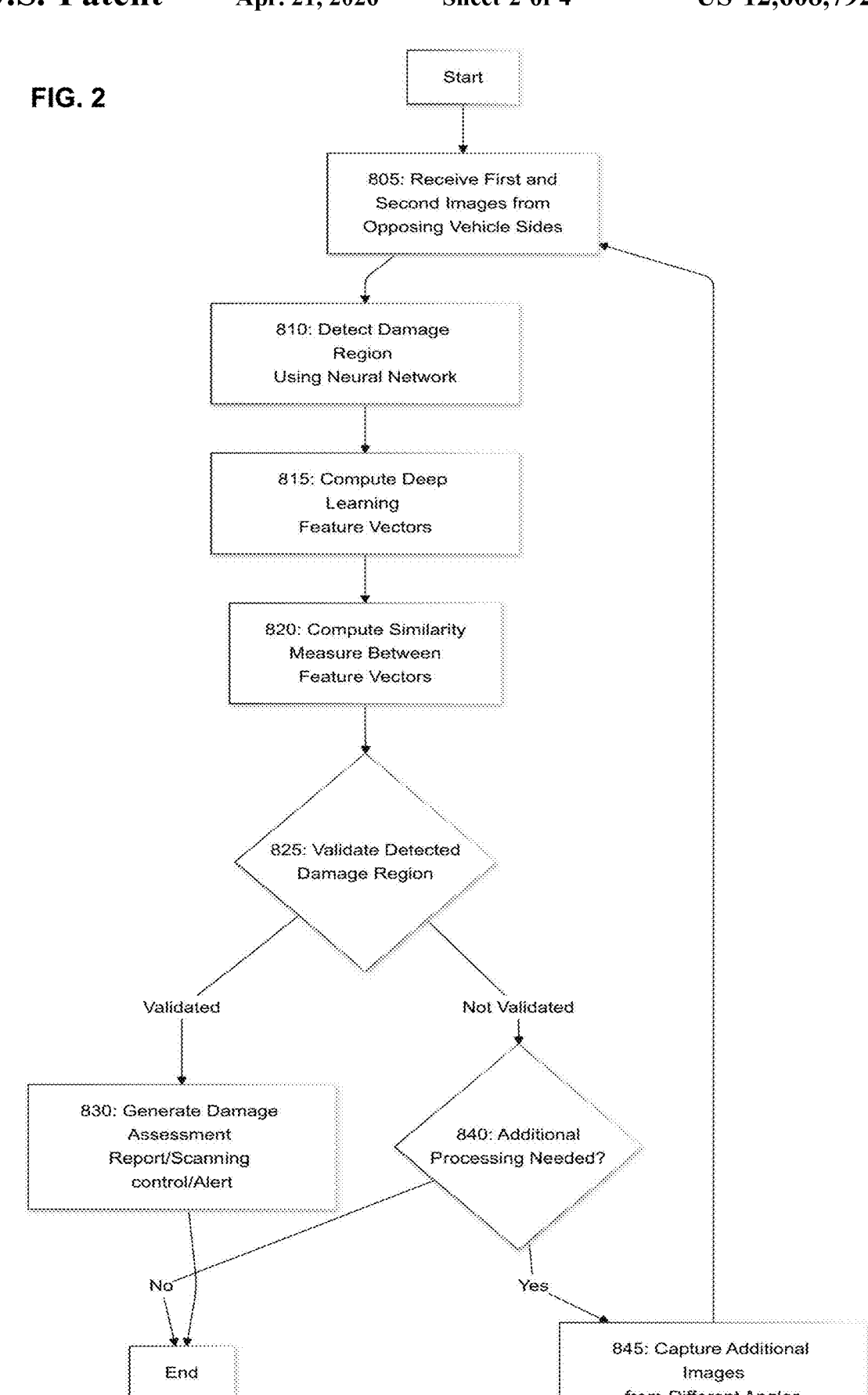
FIG. 2 is a flowchart of a computer-implemented method for validating vehicle damage detection, in accordance with some embodiments of the present invention.

Reference is now also made to FIG. 2 which is a flowchart of a computer-implemented method for validating vehicle damage detection is performed by one or more processors (111) executing instructions stored in memory (112) according to some embodiments of the invention. The method maybe implemented using the system depicted in FIG. 1.

The method includes receiving (805) first and second images captured by sensors (157) from opposing sides of a vehicle (140, 160). The first and second images may be captured simultaneously or sequentially, and may include various image types such as visible light, infrared, or depth images. The sensors may capture additional data such as timestamp information, vehicle position data, or environmental conditions.

The method includes receiving (805) first and second images captured by sensors (157) from opposing sides of a vehicle (140, 160). The first and second images may be captured simultaneously or sequentially, and may include various image types such as visible light, infrared, or depth images. The sensors may capture additional data such as timestamp information, vehicle position data, or environmental conditions.

Optionally, the method further comprises determining lighting conditions in the first and second images and validating the lighting conditions meet a quality threshold prior to computing deep learning feature vectors as described below. For example, when examining a vehicle's surface, the system might analyze the image histogram to ensure proper exposure and contrast levels. In one implementation, the system may measure ambient light levels, detect shadows or highlights, and evaluate overall image clarity. In another implementation, the system might analyze the uniformity of illumination across symmetrical vehicle regions. If the lighting quality falls below the threshold—such as when shadows obscure detail or glare creates overexposed areas—the system may request new images under improved lighting conditions. This lighting validation step provides crucial benefits by ensuring consistent and reliable damage detection results, reducing false positives from lighting artifacts, and maintaining high accuracy in feature vector generation. The method is particularly effective in real-world inspection environments where lighting conditions can vary significantly throughout the day or across different inspection locations.

Optionally, the method further comprises detecting environmental conditions during image capture, applying environmental-specific preprocessing to the images based on the detected conditions, and adjusting similarity measure thresholds based on the environmental conditions. For example, the system might detect images captured on a bright, sunny day with strong shadows, or in a dimly lit indoor environment. In one implementation, if bright sunlight is detected, the system could apply adaptive contrast enhancement to shadowed areas of the vehicle to reveal potential damage that might otherwise be obscured. In another implementation, for images captured in rainy conditions, the system might apply specialized filters to remove water droplets or glare from wet surfaces before analysis. The similarity measure thresholds could then be dynamically adjusted—for instance, lowering the threshold for damage validation in challenging lighting conditions to reduce false negatives. This adaptive approach provides several benefits, including improved accuracy across a wide range of real-world inspection scenarios, reduced need for controlled lighting environments, and increased reliability in mobile or field-based vehicle inspections. The method is particularly effective in maintaining consistent damage detection performance despite varying weather, time of day, or location-specific lighting conditions, enabling more flexible and robust deployment of the damage assessment system.

Optionally, the method further comprises normalizing brightness and contrast of corresponding regions in the first and second images prior to computing the deep learning feature vectors. For example, when comparing opposite side panels of a vehicle where one side is in shadow and the other in bright light, the system automatically adjusts the brightness levels to achieve comparable illumination. In one implementation, the normalization process may use histogram equalization techniques customized for vehicle surface characteristics. In another implementation, the system might apply adaptive contrast enhancement that preserves important surface detail while reducing lighting-induced variations. As a specific example, if a vehicle's driver's side is photographed in direct sunlight with high contrast, while the passenger side is in shade with lower contrast, the normalization process adjusts both images to a standardized brightness and contrast range. This preprocessing step provides significant benefits by reducing false asymmetries caused by lighting variations, enabling more reliable feature comparison between vehicle sides, and improving the overall accuracy of damage validation. The method is particularly effective in real-world inspection environments where consistent lighting cannot be guaranteed.

The method further includes detecting (810) a damage region in the first image using one or more processors executing a neural network. The detection process may involve analyzing image features, identifying visual anomalies, and classifying potential damage areas. The neural network may be trained on extensive datasets of vehicle damage images and may incorporate multiple detection algorithms for different types of damage. The system uses a deep neural network to generate high-quality feature representations (vectors) of vehicle images. For each detected damage region, the system may project a bounding box to a corresponding location on the opposite side of the vehicle. Feature vectors may then be extracted and compared from both the original damage region and the projected region on the opposite side. A similarity measure, such as cosine similarity, may be computed between these feature vectors. This similarity score may be used to validate whether the detected damage is genuine or a false positive caused by symmetric vehicle features or imaging artifacts.

Optionally, computing deep learning feature vectors comprises performing region of interest pooling operations on convolutional feature maps generated by the neural network. For example, when analyzing a dent on a vehicle fender, the region of interest pooling might adaptively scale and pool the convolutional features specifically within the detected damage region, regardless of its size or aspect ratio. In one implementation, the pooling operation may maintain spatial relationships within the damage region while producing a fixed-size feature representation. In another implementation, multi-scale pooling may be applied to capture damage characteristics at different levels of detail. This approach is particularly beneficial for handling damage regions of varying sizes and shapes, as it ensures consistent feature vector dimensionality while preserving important spatial information. The adaptive nature of region of interest pooling also enables more efficient processing by focusing computational resources on relevant areas of the feature maps.

Optionally, detecting the damage region comprises generating a first bounding box around the damage region in the first image and determining a projected bounding box location in the second image by applying a geometric transformation to the first bounding box, wherein the geometric transformation accounts for asymmetric positioning of the vehicle between the first and second images. For example, if a dent is detected on the driver's side door and enclosed in a bounding box, the geometric transformation projects where that same bounding box should appear on the passenger side door, even if the vehicle is not perfectly centered in the scanner. In one implementation, the geometric transformation may use reference points such as wheels, mirrors, or other easily identifiable vehicle features to calculate the projection. In another implementation, the transformation may incorporate depth information to account for perspective changes between the images. This approach provides particular benefits in real-world inspection scenarios where perfect vehicle positioning is impractical, enabling reliable damage validation even when the vehicle is slightly skewed or offset in the inspection area.

Optionally, validating the detected damage region is performed by computing an error measure between corresponding deep learning feature vectors from opposing sides of the vehicle to detect asymmetric visual patterns, filtering false positive detections caused by symmetric design features of the vehicle based on the error measure, and classifying the damage region as validated damage when the error measure exceeds a learned asymmetry threshold. The error measure may be computed using various mathematical techniques such as mean squared error, cross-correlation, or custom distance metrics. The filtering process may incorporate vehicle-specific databases of known symmetric features to improve accuracy. The learned asymmetry threshold may be dynamically adjusted based on factors such as vehicle model, lighting conditions, or image quality metrics.

The method proceeds with computing (815) deep learning feature vectors comprising learned visual representations of the damage region in the first image and a corresponding region in the second image. The deep learning feature vectors comprise numerical representations of visual patterns learned through neural network training to discriminate between damage patterns and normal vehicle features. These feature vectors may capture various aspects such as texture patterns, color variations, shape deformations, and surface characteristics.

Optionally, computing the deep learning feature vectors comprises extracting a first localized deep learning feature vector from the neural network's feature maps of the first image using the first bounding box and extracting a second localized deep learning feature vector from the neural network's feature maps of the second image using the projected bounding box. For example, if analyzing damage to a vehicle door, the system might extract feature vectors representing visual characteristics such as surface contours, texture patterns, and color variations specifically within the bounded regions. In another example, when examining potential bumper damage, the feature vectors might capture subtle deformation patterns and material stress indicators within the specified areas. This localized approach provides enhanced accuracy by focusing the analysis on precisely corresponding regions of the vehicle, reducing noise from surrounding areas and improving the reliability of the damage validation process. The method is particularly effective for detecting subtle damages that might be missed by more general analysis approaches.

Optionally, the method further comprises performing max pooling operations on the extracted deep learning feature vectors to generate fixed-dimension feature representations prior to computing the similarity measure. For example, when analyzing a large dent spanning multiple regions of a vehicle panel, the max pooling operation might reduce a high-dimensional feature representation to a more compact form while preserving the most salient damage characteristics. In one implementation, the max pooling may be applied in a hierarchical manner, first pooling local regions and then combining them to capture damage patterns at different scales. This dimensionality reduction approach provides several technical advantages, including reduced computational overhead, improved processing speed, and more robust comparison between vehicle regions of different sizes. The fixed-dimension output is particularly beneficial for maintaining consistent processing times regardless of the damage area size and enables efficient batch processing of multiple damage regions.

A similarity measure is then computed (820) between the deep learning feature vectors of the damage region and the corresponding region. The similarity measure may be calculated using various metrics such as cosine similarity, Euclidean distance, or specialized comparison algorithms. The computation may incorporate weightings for different feature types and adjust for factors such as lighting variations or viewing angles.

Optionally, computing the similarity measure comprises computing a cosine similarity between the first and second localized deep learning feature vectors in their high-dimensional feature space. For instance, when comparing feature vectors derived from corresponding door panels, the cosine similarity calculation measures the angular difference between these vectors, providing a normalized similarity score between −1 and 1. As a specific example, undamaged symmetrical regions typically yield high cosine similarity scores (close to 1), while regions where one side has damage and the other doesn't show lower similarity scores. This approach provides particular advantages in handling the complex, high-dimensional nature of deep learning features, as the cosine similarity remains effective regardless of the absolute magnitudes of the feature vectors and is primarily sensitive to the pattern differences that indicate damage. The method is especially robust in cases where the damage causes subtle but consistent changes in the feature patterns, such as small dents or paint scratches that might be difficult to detect with simpler comparison metrics.

Optionally, the method further comprises filtering detected damage regions having a similarity measure below a predetermined threshold. For example, when a potential scratch is detected on a door panel, if the similarity measure between this region and its corresponding region on the opposite side is 0.85 (where 1.0 indicates perfect similarity), and the predetermined threshold is 0.80, the detection would be filtered out as a false positive. In one implementation, different thresholds may be applied based on vehicle regions—body panels might use a higher threshold than complex areas like grilles or trim. In another implementation, the threshold may be dynamically adjusted based on environmental conditions such as lighting quality or camera angle. This filtering approach provides particular benefits in eliminating false positives caused by shadows, reflections, or normal vehicle design features that might be initially flagged as damage. The method significantly improves validation accuracy while reducing the processing load for subsequent analysis steps by early elimination of unlikely damage candidates.

The method concludes with validating (825) the detected damage region based on the similarity measure. The validation process may employ threshold-based decisions, probabilistic scoring, or multi-factor analysis incorporating additional contextual information. The validation may also consider historical data, vehicle-specific characteristics, and environmental factors.

Optionally, the method further comprises validating by computing a confidence score based on the similarity measure and classifying the damage region as validated when the confidence score exceeds a threshold. For example, if the similarity measure between a potential dent on the driver's side door and the corresponding area on the passenger side door yields a confidence score of 0.85 (on a scale of 0 to 1), and the validation threshold is set at 0.80, the system would classify this as validated damage. In another implementation, different thresholds may be applied to different vehicle areas or damage types—a higher threshold might be used for body panels, while a lower threshold could be applied to more complex areas like grilles or trim pieces. This confidence scoring approach provides several benefits, including more nuanced decision-making in damage validation, the ability to adjust sensitivity based on specific use cases or customer requirements, and a quantifiable measure of certainty for each detected damage instance. The method is particularly effective in handling borderline cases and can be easily tuned to balance between false positive and false negative rates in damage detection.

Optionally, as shown at (830), the method further comprises generating a damage assessment report based on validated damage regions for processing an insurance claim. For example, the report may include detailed visual documentation of each validated damage area, with corresponding similarity scores and confidence metrics. In one implementation, the report may incorporate cost estimates for repair or replacement of damaged components, using current market data and local labor rates. In another implementation, the report may include a timeline view showing damage progression if multiple assessments have been performed over time. The report may also include annotated images highlighting the validated damage regions with color-coded severity indicators. This automated reporting provides significant benefits in streamlining the claims process, ensuring consistency in damage documentation, and reducing the time required for claim adjudication. The standardized format of these reports particularly benefits insurance adjusters by providing them with comprehensive, objective data for claim processing.

Optionally, as shown at (840), the method further comprises, when the similarity measure fails to validate the damage region: capturing additional images of the vehicle from different angles (845); performing the computing steps using the additional images; and validating the damage region based on a combined analysis of all captured images. For example, if an initial comparison of a suspected dent on a door panel yields inconclusive results, the system might prompt for additional images to be taken from various angles around the door. In one implementation, these additional images could include close-up shots, images captured under different lighting conditions, or views from oblique angles that might better reveal surface deformations. The system then processes these new images using the same deep learning techniques and combines the results with the initial analysis. For instance, if three out of five additional image comparisons strongly indicate damage, the system might validate the damage even if the initial comparison was borderline. This approach provides several benefits, including increased accuracy in complex or subtle damage cases, reduced false negatives in situations where damage is not immediately apparent from standard angles, and a more robust validation process that can adapt to challenging inspection scenarios. The method is particularly effective in handling cases where damage might be partially obscured, such as dents near panel edges or in areas with complex surface geometries.

Optionally, the method further comprises detecting multiple damage regions in the first image, computing an aggregate similarity score based on similarity measures of all detected damage regions, and validating the damage regions collectively when the aggregate similarity score exceeds a threshold. For example, if a vehicle has sustained damage from a side impact, the system might detect multiple areas of damage along the side panel, including a dent in the door, a scratch on the fender, and a misaligned trim piece. Instead of validating each damage region independently, the system computes an aggregate score that considers the collective similarity measures of all detected regions. In one implementation, this aggregate score might be a weighted average of individual similarity scores, with weights assigned based on damage severity or region size. In another implementation, the system might use a voting mechanism where each detected region contributes to an overall confidence score. This collective validation approach provides several benefits, including improved accuracy in cases of widespread or interconnected damage, reduced false positives by considering the broader context of multiple damage areas, and more efficient processing for complex damage scenarios. The method is particularly effective in handling accidents that result in multiple points of damage, ensuring a comprehensive and accurate assessment of the vehicle's condition.

Optionally, the method is integrated into a comprehensive scan station control system, where the output of the damage validation process directly influences station operations. For example, the system may automatically adjust scanning parameters based on initial damage assessments. If significant damage is detected and validated on one side of the vehicle, the scan station may trigger additional, more detailed scans of that area. This adaptive scanning approach optimizes the inspection process by focusing resources on areas most likely to require attention. The scan station control system may incorporate multiple inspection stages. For instance, an initial rapid scan could be performed as the vehicle enters the station, with the symmetry-based damage validation method quickly identifying potential damage areas. Based on these results, the control system could direct the vehicle to specific secondary inspection points within the station for more thorough examination. This might involve deploying additional sensors, adjusting lighting conditions, or positioning the vehicle for optimal angle captures of suspected damage regions. In practical applications, the system's output can trigger various automated actions. For example, if validated damage exceeds certain thresholds, the system could automatically generate and send notifications to relevant parties. This might include alerting fleet managers about vehicles requiring immediate attention, notifying insurance adjusters of potentially significant claims, or informing repair shops about incoming vehicles with specific damage profiles. The system can also interface with other hardware components within the inspection environment. For instance, based on the damage validation results, the system might activate specific lighting arrays to better illuminate areas of concern, deploy automated camera arms to capture close-up images of validated damage regions, or trigger the use of specialized sensors (such as paint thickness gauges or ultrasonic scanners) for more detailed assessment of particular areas. In a fully automated inspection facility, the damage validation results could control the movement of vehicles through the inspection process. Conveyor systems or automated guided vehicles (AGVs) could be directed to move damaged vehicles to designated areas for further inspection or immediate repair, while vehicles with no detected damage could be routed directly to exit or storage areas. The system may also integrate with digital documentation processes. Upon validating damage, it could automatically populate repair estimate forms, generate comprehensive inspection reports, or update vehicle condition databases. This streamlines administrative processes and ensures consistent, objective documentation of vehicle conditions. For applications in rental car returns or lease-end inspections, the system could be linked to customer-facing interfaces. Validated damage detections could trigger the generation of on-the-spot condition reports, complete with annotated images and estimated repair costs, which could be immediately presented to customers on display screens or mobile devices. These enhancements to the system demonstrate its versatility in practical, real-world applications, showcasing how the damage validation method can be integrated into broader automated inspection and decision-making processes.

These embodiments described herein provide significant technical advantages including increased accuracy in damage detection through symmetrical validation, reduction in false positives from vehicle design features, and/or robust performance across varying environmental conditions. The method can effectively handle different vehicle types and damage patterns while maintaining computational efficiency. The method may be enhanced with various optional steps such as preprocessing images to normalize lighting and contrast, filtering detected regions based on confidence scores, or generating detailed validation reports. The method can be implemented in real-time processing systems or as part of batch analysis workflows, providing flexibility for different operational requirements.

Figure 3:
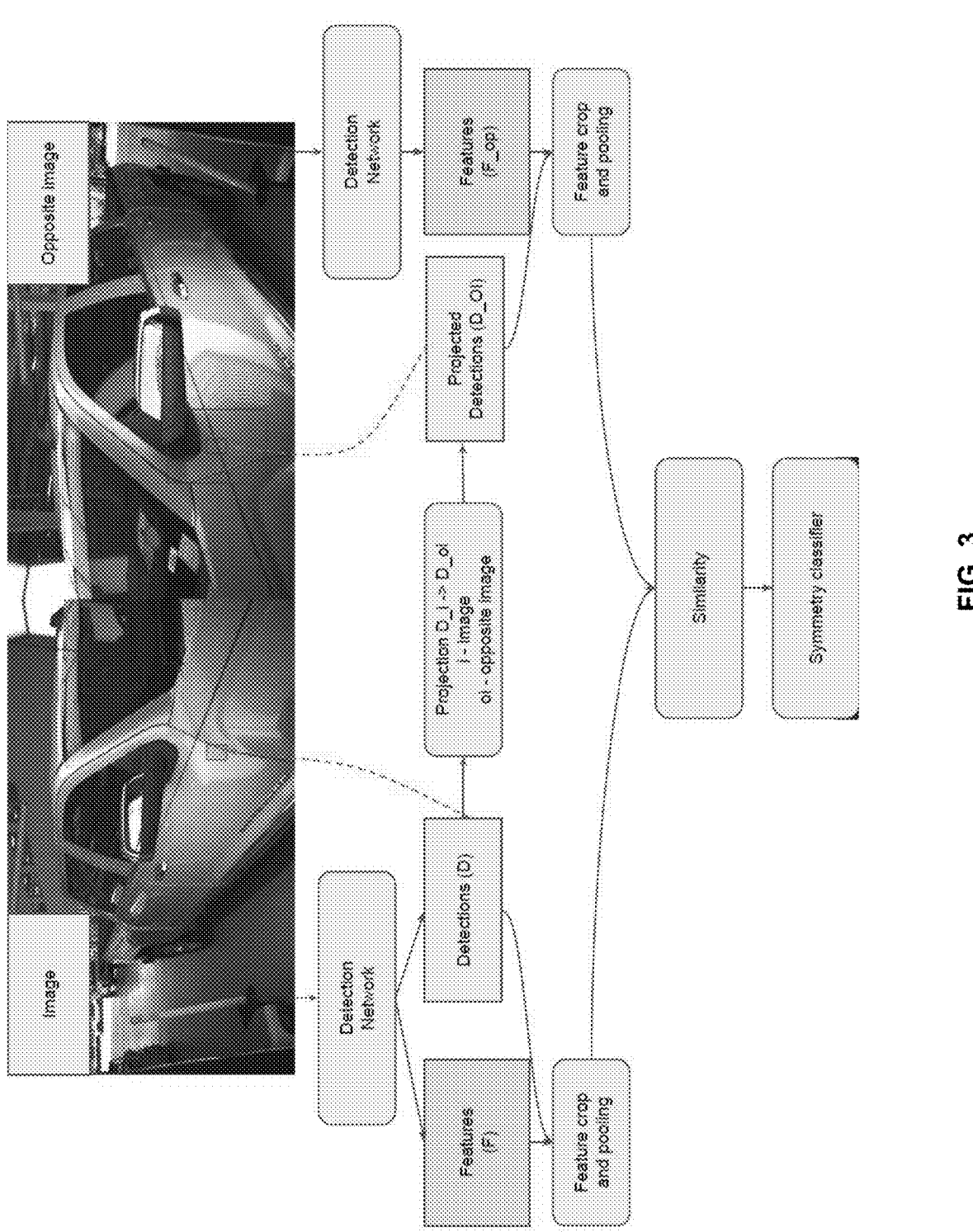
FIG. 3 is a diagram illustrating an exemplary flow of actions in an implementation of the method depicted in FIG. 2, in accordance with some embodiments of the present invention.

Reference is made to FIG. 3 which is an exemplary flow of actions in an exemplary implantation of the method depicted in FIG. 2, according to some embodiments of the present invention. First the input images are processed. For each image in a set of scanned vehicle images the following is performed:

a. Obtain the corresponding opposite side image of the vehicle.

b. Apply a detection neural network to the current image to obtain damage detections and feature maps.

c. Apply the same detection neural network to the opposite side image to obtain opposite side feature maps.

This allows performing a detection analysis:

For each detected damage region in the current image:

a. Project the detected region to a corresponding location on the opposite side image using a geometric transformation.

b. Extract and pool features from the current image's feature maps within the detected region.

c. Extract and pool features from the opposite side image's feature maps within the projected region.

Now similarity computation is held:

Compute a similarity score between the extracted features from the current and opposite side images.

The similarity score is typically calculated using a cosine similarity metric in the high-dimensional feature space.

This allows to compare the computed similarity score to a predetermined threshold such that if the similarity score is below the threshold, discard the detected damage region as a likely false positive.

This exemplary process symmetry-based filtering algorithm provides several technical advantages:

It effectively reduces false positive detections by leveraging the inherent symmetry of vehicle structures.

The use of a neural network for both detection and feature extraction ensures a consistent, learned representation of vehicle surfaces.

The projection of detected regions to the opposite side accounts for potential asymmetries in vehicle positioning during image capture.

The feature cropping and pooling operations allow for localized, scale-invariant comparison of potential damage areas.

The cosine similarity metric in high-dimensional space provides a nuanced comparison that is robust to minor variations in lighting or perspective.

Figures 4A, 4B:
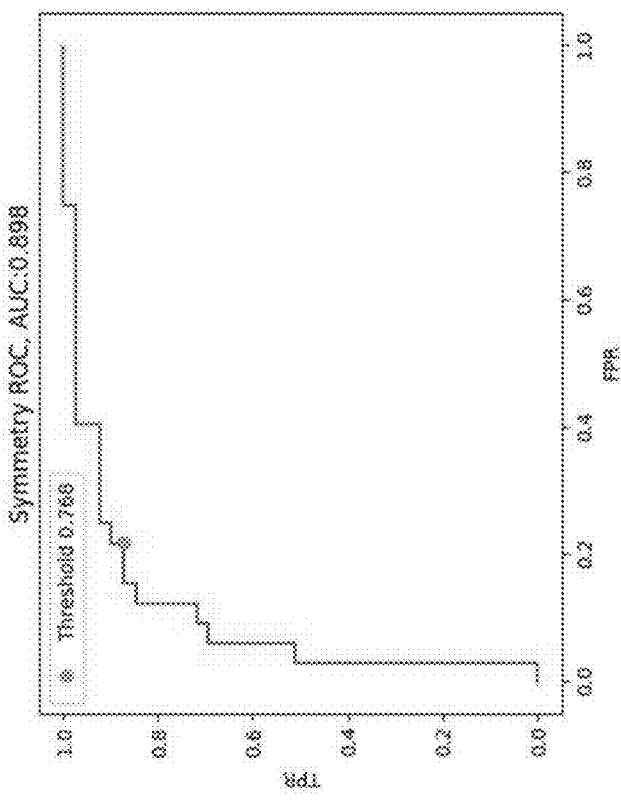
FIG. 4A is a table depicting experimental results of the symmetry-based dent validation method, in accordance with some embodiments of the present invention.
FIG. 4B is a graph visualizing the experimental results shown in FIG. 4A, in accordance with some embodiments of the present invention

Reference is now made to FIGS. 4A and 4B which are a table and a graph depicting experimental results wherein the symmetry-based dent validation described herein when implementing the method depicted in FIG. 2, referred to as Dent, is shown with symmetry filtering measures, referred to as Symmetry. The Dent achieved a precision of 0.9 and recall of 0.85 for dent detection, with an F1 score of 0.88. The Symmetry achieved precision of 0.84 and recall of 0.9, with an F1 score of 0.87. For clarity, F1 score is a common metric used in machine learning and statistics to measure the accuracy of a binary classification model and provides a single score that balances both precision and recall. The F1 score is the harmonic mean of precision and recall, calculated as: $F1=2*(Precision*Recall)/(Precision+Recall)$ Where: —Precision is the ratio of correctly predicted positive observations to the total predicted positive observations. Recall is the ratio of correctly predicted positive observations to all actual positive observations. The F1 score ranges from 0 to 1, with 1 being the best possible score and 0 being the worst. The F1 scores in the table indicate that the model performs well in balancing precision and recall for both dent detection and symmetry filtering. An F1 score of 0.88 for dent detection and 0.87 for symmetry filtering suggests strong overall performance, as these scores are close to 1.

Optionally, the method further comprises generating a three-dimensional (3D) model of the vehicle based on the first and second images, and validating the detected damage region using the 3D model. For example, the system may use photogrammetry techniques to construct a detailed 3D representation of the vehicle's surface contours. This 3D model can then be analyzed to detect and quantify surface deformations that may indicate damage. The use of a 3D model provides several benefits, including improved accuracy in damage assessment, especially for subtle dents or warping that may be difficult to detect in 2D images alone. Additionally, the 3D model allows for more precise measurement of damage extent and severity, which can be valuable for repair cost estimation. Optionally, the method includes applying a machine learning model trained on a dataset of damaged and undamaged vehicles to classify the detected damage region into predefined damage categories. This classification may include categories such as dent, scratch, crack, or paint damage. The machine learning model may be a convolutional neural network or other suitable architecture trained on a large, diverse dataset of vehicle damage images. This approach provides benefits such as standardized damage categorization, which can improve consistency in damage assessments across different inspectors or locations. It also enables more detailed reporting and analysis of damage patterns across vehicle fleets or insurance claim databases. Optionally, the system comprises a mobile device with an augmented reality (AR) interface for guiding a user through the image capture process. The AR interface may provide real-time guidance on optimal camera positioning, ensuring consistent image capture across different vehicles and users. For example, the interface might overlay virtual markers on the device's camera view to indicate recommended capture points around the vehicle. This AR-assisted capture process offers benefits such as improved image consistency, reduced training requirements for inspection personnel, and potential for faster, more efficient inspections.

It is expected that during the life of a patent maturing from this application many relevant hardware components will be developed and the scope of the term a sensor and a processor is intended to include all such new technologies a priori.

As used herein the term "about" refers to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the Applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computer-implemented method for analyzing vehicle damage, comprising:

receiving, at one or more processors, first and second images from opposing sides of a vehicle;

detecting, using the one or more processors, a damage region in the first image;

computing, by a neural network, deep learning feature vectors, wherein the deep learning feature vectors comprising:

(a) learned visual representations of the damage region in the first image and a corresponding region in the second image, (b) numerical representations of visual patterns learned through neural network training to discriminate between damage patterns and normal vehicle features;

computing a similarity measure between the deep learning feature vectors of the damage region and the corresponding region using a metric selected from one or more members of a group consisting of: a cosine similarity, an Euclidean distance, and specialized comparison algorithms; and validating the detected damage region based on the similarity measure; wherein the validating the detected damage region is performed by:

computing an error measure between corresponding deep learning feature vectors from opposing sides of the vehicle to detect asymmetric visual patterns;

filtering false positive detections caused by symmetric design features of the vehicle based on the error measure; and classifying the damage region as validated damage when the error measure exceeds a learned asymmetry threshold.

2. The method of claim 1, wherein detecting the damage region comprises:

generating a first bounding box around the damage region in the first image; and determining a projected bounding box location in the second image by applying a geometric transformation to the first bounding box;

wherein the geometric transformation accounts for asymmetric positioning of the vehicle between the first and second images.

3. The method of claim 2, wherein computing, by the neural network, the deep learning feature vectors comprises:

extracting a first localized deep learning feature vector from the neural network's feature maps of the first image using the first bounding box; and extracting a second localized deep learning feature vector from the neural network's feature maps of the second image using the projected bounding box.

4. The method of claim 3, wherein computing the similarity measure comprises computing a cosine similarity between the first and second localized deep learning feature vectors in their high-dimensional feature space.

5. The method of claim 1, further comprising generating a damage assessment report based on validated damage regions for processing an insurance claim.

6. The method of claim 3, further comprising performing max pooling operations on the extracted deep learning feature vectors to generate fixed-dimension feature representations prior to computing the similarity measure.

7. The method of claim 1, further comprising filtering detected damage regions having a similarity measure below a predetermined threshold.

8. The method of claim 1, wherein the neural network comprises a single end-to-end detection network trained to simultaneously detect vehicle damage and generate deep learning feature vectors.

9. The method of claim 1, wherein computing deep learning feature vectors comprises performing region of interest pooling operations on convolutional feature maps generated by the neural network.

10. The method of claim 1, further comprising:

determining lighting conditions in the first and second images; and validating the lighting conditions meet a quality threshold prior to computing the deep learning feature vectors.

11. The method of claim 1, wherein the neural network is trained using a dataset comprising images of vehicles having known symmetric and asymmetric regions.

12. The method of claim 1, further comprising normalizing brightness and contrast of corresponding regions in the first and second images prior to computing the deep learning feature vectors.

13. The method of claim 1, wherein validating comprises:

computing a confidence score based on the similarity measure; and classifying the damage region as validated when the confidence score exceeds a threshold.

14. The method of claim 1, further comprising: detecting multiple damage regions in the first image; computing an aggregate similarity score based on similarity measures of all detected damage regions; and validating the damage regions collectively when the aggregate similarity score exceeds a threshold.

15. The method of claim 1, further comprising:

when the similarity measure fails to validate the damage region:

capturing additional images of the vehicle from different angles;

performing the computing steps using the additional images; and validating the damage region based on a combined analysis of all captured images.

16. The method of claim 1, further comprising: detecting environmental conditions during image capture; applying environmental-specific preprocessing to the images based on the detected conditions; and adjusting similarity measure thresholds based on the environmental conditions.

17. The method of claim 1, wherein the corresponding region is determined by applying a geometric transformation to account for asymmetric vehicle positioning.

18. The method of claim 1, wherein validating the detected damage region comprises:

computing a similarity score between the deep learning feature vectors of the damage region and the corresponding region;

classifying the detected damage as validated if the similarity score is below a predetermined threshold, indicating significant difference between the damage region and its symmetrical counterpart.

* * * * *